United States Patent [19]

Gaudin et al.

[11] Patent Number: 4,942,280
[45] Date of Patent: Jul. 17, 1990

[54] DEVICE FOR WELDING THE END OF A TUBULAR PIECE FASTENED INSIDE A BORE OPENING ONTO A FACE OF A PLATE, SUCH AS A TUBE PLATE OF A STEAM GENERATOR

[75] Inventors: Jean P. Gaudin, Chassieu; Jean P. Peyrot, Chilly-Mazarin, both of France

[73] Assignee: Framatome, Courbevoie, France

[21] Appl. No.: 270,722

[22] Filed: Nov. 14, 1988

[30] Foreign Application Priority Data

Nov. 13, 1987 [FR] France ............................. 87 15731

[51] Int. Cl.$^5$ ............................................. B23K 9/12
[52] U.S. Cl. ............................. 219/60.2; 219/125.11
[58] Field of Search ............... 219/60.2, 125 R, 125.1, 219/125.11, 60 A; 901/42

[56] References Cited

U.S. PATENT DOCUMENTS

| 2,818,493 | 12/1957 | Pilia et al. | 219/60.2 |
| 4,262,187 | 4/1981 | Savor | 249/60.2 |
| 4,427,868 | 6/1984 | Kazlauskas | 219/60.2 |

FOREIGN PATENT DOCUMENTS

1006698 9/1957 Fed. Rep. of Germany.

*Primary Examiner*—Clifford C. Shaw
*Attorney, Agent, or Firm*—Pollock, Vande Sande & Priddy

[57] ABSTRACT

The welding device including an adjustable connecting assembly includes a fastening mechanism (12), having a cylindrical part (12a) to be introduced into a tube (6) of a network, and a jack (12b) for actuating the cylindrical part (12a), and a welding head (11) including a centering bush (28) to be introduced into the tubular piece (8) to be welded and a welding electrode (26) mounted rotatably about the axis of the bush (28). The fastening mechanism (12) and the welding head (11) are connected by means of the adjustable connecting assembly (13) allowing relative translational movements of the welding head (11) in relation to the fastening mechanism (12) in the direction of the perpendicular common to the axis of the cylindrical part (12a) and to the axis of the bush (28) and relative rotational movements about two perpendicular axis (21, 22), one of which is parallel to the direction of translational movement (18).

5 Claims, 4 Drawing Sheets

DEVICE FOR WELDING THE END OF A TUBULAR PIECE FASTENED INSIDE A BORE OPENING ONTO A FACE OF A PLATE, SUCH AS A TUBE PLATE OF A STEAM GENERATOR

FIELD OF THE INVENTION

The invention relates to a device in welding a circular end part of a tubular piece fastened inside a bore opening onto a face of a plate, such as a steamgenerator tube plate having a set of tube passage holes.

BACKGROUND OF THE INVENTION

The steam generators of pressurized-water nuclear reactors comprise a tube plate of great thickness, usually exceeding 500 mm, having several thousand holes, in each of which is fastened one end of a tube of the steam generator. Each of the holes passing through the tube plate opens at one of its ends into the inlet face of the tube plate, inside the water box of the steam generator.

When the steam generator is in operation, the tubes undergo corrosion which is generally more pronounced in the region of the tubes which is adjacent to the outlet face of the tube plate. In order to conduct an examination of the regions of the tube which have undergone corrosion and to evaluate how far this corrosion has advanced, it may be necessary to extract the part of the tube located inside the tube plate and a more or less long part of the tube located beyond the outlet face, depending on the location of the regions which have undergone maximum corrosion and depending on the types of checks to be carried out on the tubes.

When one or more tubes have been extracted, it is necessary to ensure that the hole passing through the tube plate is plugged at the location of each of the extracted tubes, before the steam generator is put into operation again. For each of the extracted tubes, a sleeve is therefore installed in the passage hole of the tube, and this sleeve is fastened in the tube, for example by expansion. A plug consisting of a tubular piece having a closed bottom is then fastened inside the sleeve on the same side as the inlet face of the tube plate. The plug, which has a diameter less than the inside diameter of the sleeve after it has been installed in the tube plate, is subjected to diametral expansion which ensures that it is retained inside the sleeve. To complete the plugging of the passage hole in the tube plate, the end of the plug is welded to the end of the sleeve, these two ends virtually coinciding with one another and being located a short distance from the inlet face of the tube plate.

The plug installed in the sleeve can be a conventional mechanical plug. In this case, only the welding of the sleeve to the tube plate is carried out.

The welding of the ends of the plug and/or of the sleeve of circular shape requires the use of a rotary or orbital welding apparatus. There must be the possibility of conducting the welding operations by remote control, in view of the fact that the work is carried out inside the water box of the steam generator, i.e., in an irradiated zone where any human involvement must be avoided or limited to as short a time as possible.

There is a known automatic welding head of the T.I.G. type which makes it possible to carry out an operation to weld the end of a tubular piece located inside a sleeve or a tube. This welding head comprises a centering bush and a welding electrode mounted rotatably about the axis of the bush.

The centering bush is engaged in the tubular piece, in such a way that the axis of the bush and the axis of the tubular piece coincide. The welding electrode is placed near the end of the tubular piece, and rotating it about the axis of the bush makes it possible to carry out the welding of the end of the tubular piece.

However, to obtain a uniform and sealing weld of very high quality, the end of the electrode must move in a plane perfectly parallel to the plane of the circular end of the tubular piece and at a short and absolutely constant distance from this end of the tubular piece forming the welding bevel.

It is therefore necessary to ensure remotely and automatically that the welding machine is positioned very accurately and fastened very firmly in relation to the tubular piece to be welded.

There are known carrier devices movable inside the water box of a steam generator, so as to come into treal alignment with each of the inlet orifices of the tubes of the steam generator in order to present a tool at these orifices successively. However, such a carrier device does not make it possible to ensure rapid positioning and perfect fastening of a welding head in the region of a tubular piece to be welded inside a tube passage hole in the tube plate.

There is also a known means for fastening a tool to the inlet face of a tube plate, comprising a cylindrical part formed in the manner of a mandrel by several deformable sectors allowing diametral expansion to ensure that the cylindrical part is fastened in the tube. The deformable sectors can be put into a retracted position as a result of the action of a jack, thus making it possible to introduce the cylindrical part into a tube. When the pressure of the jack is relaxed, the deformable sectors return to the expanded position and thus ensure that the device is fastened in the tube.

However, when the aim is to obtain perfect positioning of a tool in relation to the end of a tubular piece fastened inside a tube passage in the tube plate, such a device for fastening inside a tube adjacent to the tube passage to be plugged may be inoperative, since the axes of the tubes or of the passage holes through the tube plate are not perfectly parallel.

In fact, the direction of the passage holes is not always absolutely perpendicular to the inlet face of the tube plate and during hydraulic tests on the steam generator and during the operation of this steam generator, the tube plate experiences deformations which result in slight relative inclinations of the successive bores passing through the plate.

Furthermore, the distance between the tube passages, which is perfectly defined and absolutely constant at the inlet face of the tube plate, undergoes variations within the tube plate which are attributable to the relative inclination of the axes of the passage holes.

SUMMARY OF THE INVENTION

The object of the invention is, therefore, to provide a device for welding a circular end part of a tubular piece fastened inside a bore opening onto a face of a plate, such as a steam-generator tube plate having a set of tube passage holes arranged according to a regular network, this device being easily positionable by means of operations controlled remotely and in such a way that the welding operation is carried out under very good conditions.

To this end, the device comprises:

a fastening means, known per se, having a cylindrical part to be introduced into a tube of the network and a jack for actuating the cylindrical part, a welding head, likewise known per se, comprising a centering bush to be introduced into the tubular piece to be welded and a welding electrode mounted rotatably about the axis of the bush, and an adjustable connecting assembly between the fastening means and the welding head, allowing relative translational movements of the welding head in relation to the fastening means in the direction of the perpendicular common to the axis of the cylindrical part of the fastening means and to the axis of the bush, and relative rotational movements about two perpendicular axles, one of which is parallel to the direction of translational movement.

The adjustable connecting assembly between the fastening means and the welding head preferably comprises:

a first support fixed to the fastening means and having guide means defining a sliding plane and a sliding direction oriented along the perpendicular common to the axis of the cylindrical part of the fastening means and to the axis of the bush of the welding head, a slide block mounted movably in the sliding direction on the guide means, a second support carrying the welding head mounted on the slide block and movable in rotation relative to the slide block about a first axle parallel to the sliding direction and about a second axle parallel to the sliding plane and perpendicular to the first axle, and means for the return of the slide block in relation to the first support and the second support in relation to the slide block in the sliding direction.

BRIEF DESCRIPTION OF THE DRAWINGS

To make it easier to understand the invention, a device according to the invention used for welding closing plugs inside sleeves for the replacement of tubes of a steam generator of a pressurized-water nuclear reactor will now be described by way of example with reference to the accompanying drawings, in which.

DESCRIPTION OF PREFERRED EMBODIMENT

Figure 1:
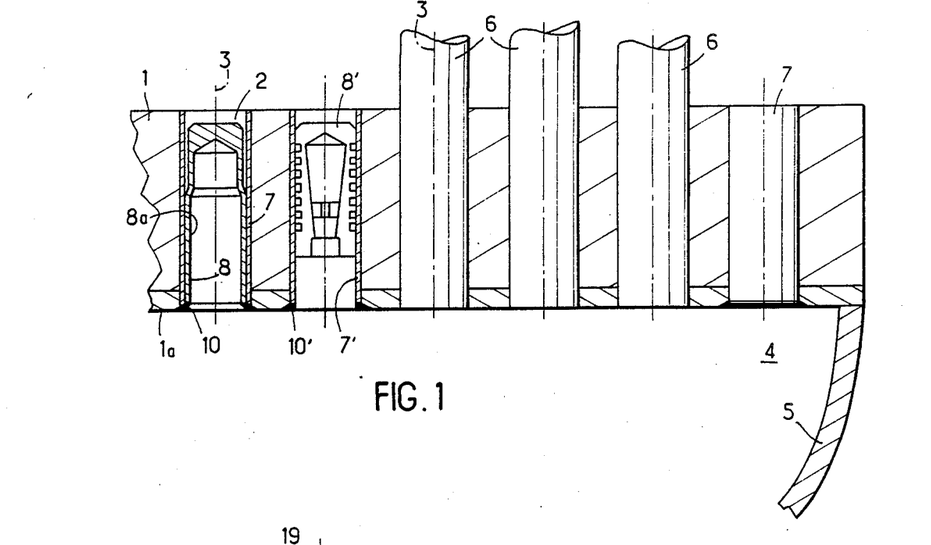
FIG. 1 is a sectional view of part of a tube plate of a steam generator of a pressurized-water nuclear reactor.

FIG. 1 shows a tube plate 1 of a steam generator of a pressurized-water nuclear reactor, which has tube passage holes 2 passing through the tube plate over its entire thickness. The passage holes 2 have substantially parallel axes 3 and open onto the inlet face 1a of the tube plate 1 inside the water box 4 of the steam generator, delimited under the tube plate 1 by a convex bottom 5.

One end of a tube 6 of the steam generator is fastened in each of the passage holes 2. The tubes 6 are fastened in the passage holes 2 by means of expansion and welding.

The inner surfaces of tubes 6 contact the primary fluid of the reactor, consisting of pressurized water, while the outer surfaces of tube 6 contact the secondary fluid of the reactor, consisting of feed water to be evaporated.

During operation, the tubes 6 experience the effects of corrosion by the fluids with which they are in contact. This corrosion is usually greater in the part of the tube crimped in the tube plate and near the outlet face of the plate opposite the inlet face 1a.

It may be necessary to carry out the extraction of a more or less long length of a tube 6 in its part located inside the tube plate and near the outlet face, in order to conduct an examination and an appraisal of the damage to the tube. The extracted part of the tube 6 is replaced by a sleeve 7 of the same diameter which is likewise fastened by crimping inside the tube plate 1. A plug 8, consisting of a tubular piece which is closed at one and its ends of the outside diameter of which is less than the inside diameter of the sleeve 7, is introduced into this sleeve and secured in place as by diametral expansion of the zone 8a. The sealing fastening of the plug is completed by a circular weld 10 made on the end part of the plug 8 arranged so as to coincide with the end part of the sleeve 7 flush with the inlet face 1a of the tube plate.

FIG. 1 also shows a mechanical plate 8' fastened in a sleeve 7', of which the end flush with the inlet face 1a of the tube plate 1 is fastened to this plate sealingly by means of a circular weld 10'.

When the steam generator from which one or more tubes 6 have been extracted is put into operation again, the corresponding sleeves and plugs ensure a sealed closure of the tube passage hole or holes 2 inside the tube plate.

The circular weld 10 made at the end of the plug 8 and the sleeve 7 is usually executed without filler metal by means of the T.I.G. process. The same applies to the weld 10' made at the end of the sleeve 7'.

An orbital T.I.G. welding head has to be introduced into the water box 4 via a manhole and positioned and controlled remotely.

To ensure perfect execution and very high quality of the weld 10, the welding head must be put in place and kept in an absolutely specific position, so that the end of the welding electrode moves in a plane perfectly parallel to the circular end of the plug 8 and of the sleeve 7 to be joined by welding.

The device according to the invention makes it possible to ensure perfect positioning and perfect guidance of the electrode, and therefore very high weld quality.

Figure 2:
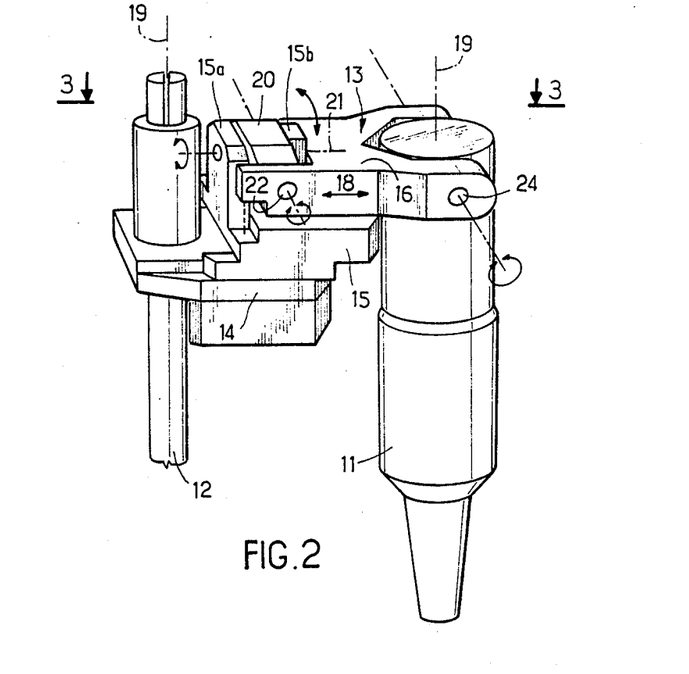
FIG. 2 is a perspective view of the welding device according to the invention.

FIG. 2 shows the entire welding device which comprises a welding head 11, a fastening means 12 and an adjustable connecting assembly 13 between these two elements.

The welding head 11 and the fastening means 12 known in the prior art will be described with reference to FIG. 3.

The connecting assembly 13 comprises a first support 14 fixed to the fastening means 12, a slide block 15 mounted so as to be movable in a translationally on the support 14, and a second support 16 consisting of yoke carrying the welding head 11.

The slide block 15 is mounted on the support 14 so as to be movable in either direction and in the direction 18 corresponding to the common perpendicular to the axes 19 and 19' of the fastening means 12 and of the welding head 11, respectively. The distance between the axes 19 and 19' can thus be adjusted.

The second support 16 is mounted on the slide block 15 by means of a set of elements forming the equivalent of a cardan joint. This assembly comprises a tumbler 20 mounted rotatably on the slide block 15, about an axle 21 parallel to the direction 18. The axle 21 and the tumbler 20 are mounted between two upwardly projecting parts 15a and 15b of the slide block 15. The yoke 16 is mounted so as to be movable in rotation on the tumbler 20 by means of an axle 22 perpendicular to the axle 21 and parallel to the sliding plane of the slide block 15 on the support 14.

The welding head 11 is thus mounted movably in terms of rotation relative to the fastening means 12 about two axes perpendicular to one another and parallel to the sliding plane of the slide block.

Furthermore, the welding head 11 is mounted rotatably about an axis 24 parallel to the axle 22 on the yoke 16.

It is therefore possible to adjust both the distance between and the relative orientation of the axes 19 and 19'.

Figure 3:
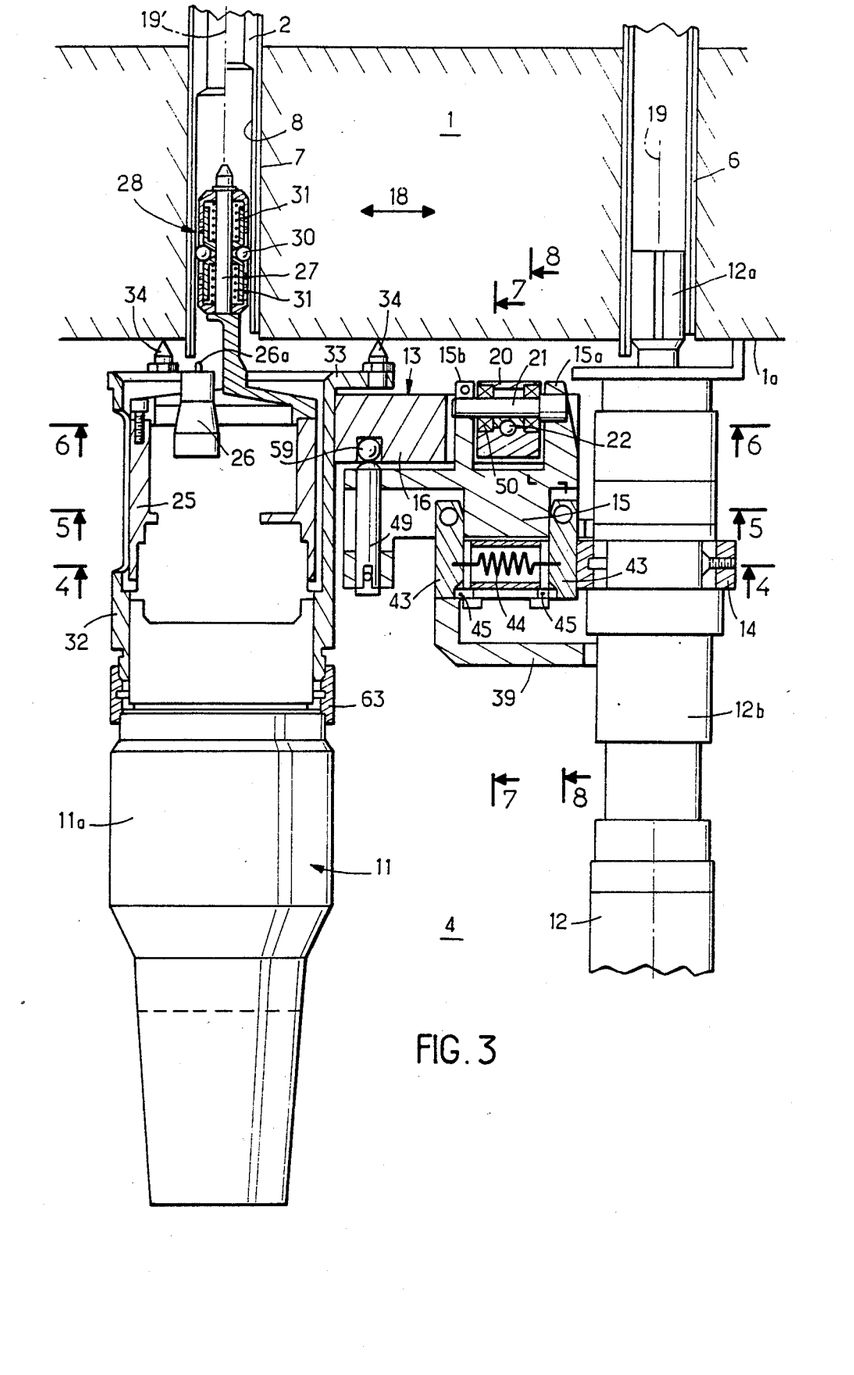
FIG. 3 is a detailed sectional view along line 3—3 of FIG. 2.

FIG. 3 shows the fastening means 12 of a known type, designed and produced by the assignee of the present application. This device comprises a cylindrical fastening part 12a formed, in the manner of a mandrel, by adjacent sectors separated by slots, and an actuating jack 12b, the body of which can be fastened to a carrier device known per se, introduced into the water box 4.

The outside diameter of the cylindrical part 12a is greater than the inside diameter of the tubes 6 of the steam generator, and this part 12a has a certain elasticity attributable to the presence of sectors separated by slots. The actuating jack makes it possible to move the sectors towards one another and inwards, so that the part 12a can be introduced into a tube. When the pressure exerted on the jack 12b is relaxed, the sectors of the part 12a return outwards as a result of elasticity and ensure that the device 12 is clamped and fastened in a tube 6, as shown in FIG. 3. It should be noted that the tube 6 can project slightly or be set in slightly in relation to the face 1a of the tube plate.

The welding head 11 shown in FIG. 3 is of a known type marketed under the brand name of ROTOMATIG by the company MECAZO. This welding head comprises a generally cylindrical body 11a receiving the supply means and containing a drive motor.

The output shaft of the motor is fixed to a movable element 25, to which the welding electrode 26 is fastened. The movable element 25 is fixed to a shaft end 27 which extends the moving element 25 towards the outside of the welding head and which forms the central part of a ball bush 28, the balls 30 of which are pushed back outward by springs 31. The bush 28 fixed to the movable element 25 has a nominal diameter which is slightly less than the inside diameter of the plug 8 to be welded and forms, in this plug, a bush for centering the welding head, the balls 30 abutting against the inner surface of the plug 8 under the effect of the springs 31.

This results in perfect alignement of the axis 19' of the welding head with the axis of the plug 8, itself coinciding with the axis of the sleeve 7, to which the plug 8 is fastened, and with the axis of the passage hole 2 of the tube plate 1.

The body 11a of the welding head 11 is extended, round the movable element 25, by a tubular support 32, by means of which the welding head 11 is connected to the adjustable connecting assembly 13. The tubular support 32, in its upper part, forms a flask 33, to which are fastened adjustable studs 34 ensuring that the welding head is positioned in the direction of the axis 19' by abutting against the face 1a of the tube plate 1.

The detailed structure of the adjustable connecting assembly 13 between the fastening means 12 and the welding head 11 will now be described in which reference to FIGS. 3 to 8. The support 14 is fixed rigidly to the body of the jack 12b.

Figure 4:
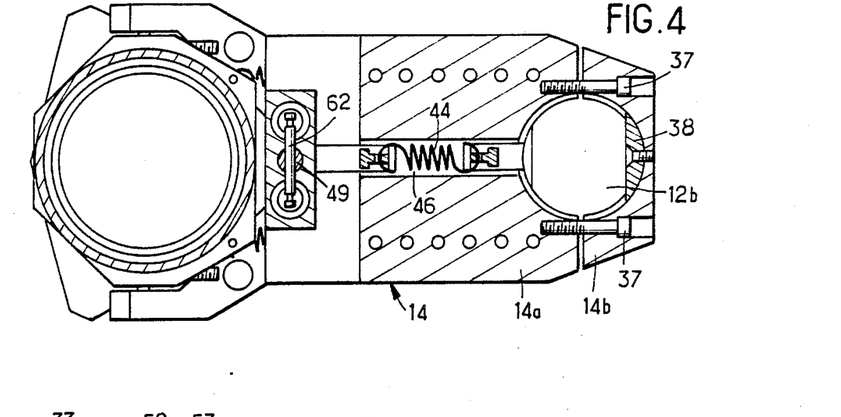
FIG. 4 is a sectional view along line 4—4 of FIG. 3.
Figure 7:
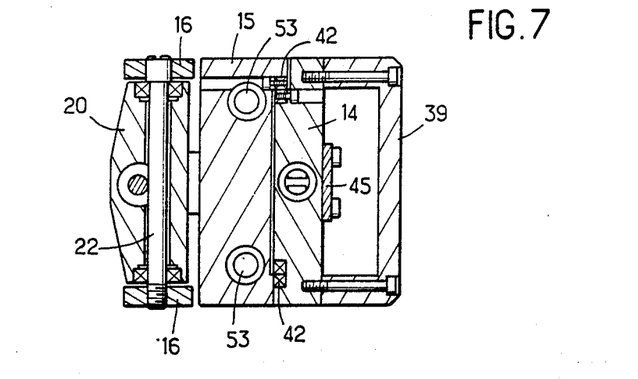
FIG. 7 is a sectional view along line 7—7 of FIG. 3.
Figure 8:
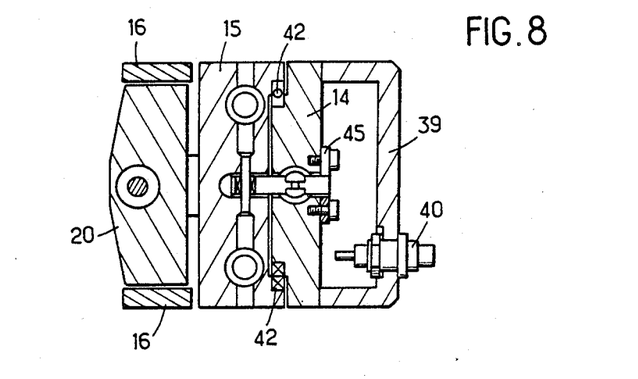
FIG. 8 is a sectional view along line 8—8 of FIG. 3.

As can be seen in FIG. 4, the support 14 comprises two matching parts 14a and 14b which each have a substantially semi-circular indentation arranged around the body of the jack 12b and which are joined to one another by screws 37. A wedge 38 is fastened by means of a screw to the part 14b of the support, inside the semi-circular indentation and ensures that the support 14 is blocked in against rotation relative to the body of the jack. As can be seen in FIGS. 3, 7 and 8, a cover 39 is fastened to the support 14 by means of screws and, in particular, ensures that the pushbutton 40 for controlling the fastening means 12 is supported.

The cover 39 also ensures that the elements for adjusting the stroke of the connection device 13 are protected.

As can be seen in FIGS. 7 and 8, the slide block 15 is mounted so as to be movable in translation on the first support 14 by means of ballbearing slideways 42 having rails, of which the direction, corresponding to the direction 18 shown in FIG. 2 is parallel to the common perpendicular to the axes 19, 19' of the welding head and of the fastening device.

As can be seen in FIGS. 3 and 4, the slide block 15 has a return device consisting of two levers 43 whose upper portions are articulated on the slide block 15 and which are returned towards one another by means of a helical spring 44 and which abut against two stop faces 45 of the support 14.

The levers 43 and the spring 44 are mounted in a groove 46 in the support 14.

Figure 5:
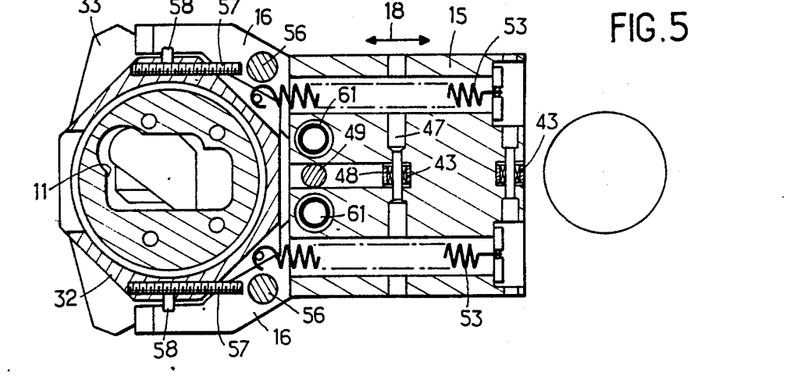
FIG. 5 is a sectional view along line 5—5 of FIG. 3.

As can be seen in FIG. 5, the levers 43 are mounted pivotably about axles 47 fastened to the slide block 15, by means of needle bearings 48.

The levers 43 and the spring 44 constitute a device for returning the slide block 15 into the position shown in FIG. 3. If the slide block 15 moves away from this position in either of the directions indicated by double-arrow 18, the return device tends to bring the slide block back into the illustrated equilibrium position.

The slide block 15 also carries a sliding spring finger 49 which, by means of a ball 59, abuts against the second support 16 of the welding head, thus ensuring that the second support 16 is retained and that there is play between the second support 16 and the slide block 15.

Figure 6:
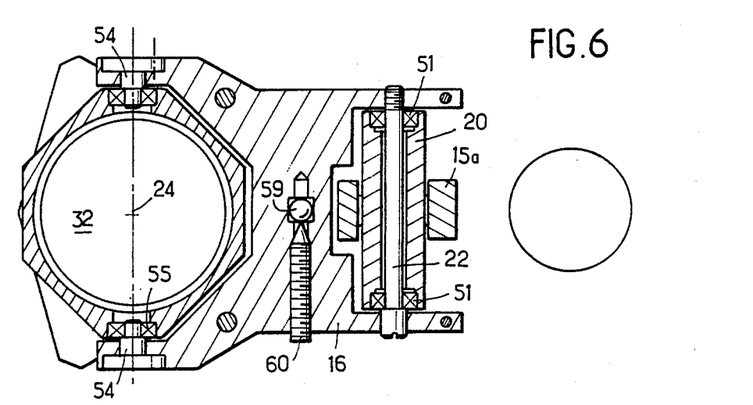
FIG. 6 is a sectional view along line 6—6 of FIG. 3.

The finger 49 abuts against the ball 59 seated in the support 16. A needle screw 60 makes it possible to move the ball 59 in order to increase the tension of the finger 49 (FIG. 6). The finger 49 is returned by means of springs 61, exerting a pull on the ends of a pin 62 fixed to the finger 49 in its lower part (FIGS. 4 and 5).

As can be seen in FIG. 3, the axle 21 for the rotation of the tumbler 20 in relation to the slide block 15 is fastened to the extensions 15a and 15b of the slide block 15. The tumbler 20 is mounted for rotation about the axle 21 by means of two rolling bearings 50.

As can be seen in FIGS. 6 and 7, the second rotary axle 22 of the welding head is fastened to the second support 16, between two parallel branches of this second support which are opposite the branches supporting the welding head. The tumbler 20 is mounted for rotation about this axle 22 by means of rolling bearings 51.

As result of this, the second support 16 is cardan mounted relative to the slide block 15 and can thus accommodate faults in parallel alignment between the axes 19 and 19'.

FIG. 5 also shows that the tubular support 32 of the welding head 11 is returned in the direction 18 corresponding to the direction of the axle 21, by means of springs 53 which are each fastened, on the one hand, to the slide block 15 and, on the other hand, to the plate 33 integral with the tubular support 32. The springs 53 ensure that the welding head is returned into a position in which its axis 19' is substantially vertical.

FIG. 5 shows, in section, two stops 56 mounted on the yoke 16 and two adjusting screws 57 detained by small screws 58, making it possible to limit the freedom of movement of the welding head 11 in the yoke 16.

The welding head 11 is mounted for pivoting movement about the axis 24, between the two arms of the yoke 16, by means of journals 54 which extend in the direction of the axis 24 and which are therefore parallel to the axle 22. The journals 54 are fixed to the branches of the yoke 16, and the tubular support 32 of the welding head 11 is mounted rotatably on these journals by means of rolling bearings 55.

The mode of operation of the device according to the invention is as follows.

Referring to FIG. 3, this shows a passage hole 2 for a tube of the bundle, in which a sleeve 7 is fastened.

The left-hand part of the passage hole 2 shows a first embodiment in which the sleeve 7 projects slightly beyond to the face 1a of the tube plate. Fastened inside the sleeve 7 as a result of diametral expansion, as explained above, is a plug 8, the end part of which is arranged so as to coincide with the end part of the sleeve 7 projecting slightly relative to the inlet face 1a of the tube plate.

The right-hand part of the passage hole 2 shows a second embodiment, in which the end part of the sleeve 7 is recessed slightly relative to the inlet face 1a of the tube plate. The corresponding end part of the plug 8 is arranged so as to coincide with the end part of the sleeve slightly within the passage hole 2.

In both cases, the device according to the invention makes it possible to carry out the welding of the end part of the plug 8 to the end part of the sleeve 7.

The position of the tungsten electrode 26 in relation to the axis 19' of the welding head is set beforehand in such a way that the tip 26a of the tungsten electrode is at a distance from the axis 19' corresponding substantially to one half the outside diameter of the plug 8 to be welded. The electrode is adjusted by conventional means.

A nut 63 makes it possible to adjust the position of the electrode 26 vertically in either direction, so that the distance between the tip 26a of the electrode and the circular zone of the plug to be welded, in the direction 19', has a small and absolutely specific value, the studs 34 abutting against the face 1a of the tube plate, as shown in FIG. 3.

It is clear, in particular, that the adjustment of the studs 34 will differ depending on whether the zone to be welded projects slightly or is set in slightly in relation to the face 1a of the tube plate.

When the previous adjustments have been made, the welding device as a whole is brought into the vicinity of the passage hole 2 in which the welding of the plug 8 is carried out, for example by using a carrier arranged inside the water box 4 and controlled remotely. The axis 19' of the welding head is placed substantially in alignment with the axis of the passage hole 2, and the ball bush 28 is engaged into the tube up to the moment when the studs 34 abut against the face 1a of the tube plate. Simultaneously, the cylindrical fastening part 12a of the device 12 is engaged into a tube 6 located near the passage hole 2 and at a distance of a few positions in the network.

In practice, the welding device is designed so that fastening is carried out in a tube located five positions away from the passage hole in which welding is carried out.

To carry out the engagement of the part 12a, the button 40 for actuating jack 12b is held locked, with the result that the part 12a is in its retracted position allowing introduction into the tube 6.

When the positioning of the welding head has been ensured, the pushbutton 40 is released as a result of remote action. The fastening device 12 takes up position in relation to the welding head 11, the position of which is fixed by the ball bush 28 and by the studs 34 abutting face 1a of the tube plate.

If the distance between the axis of the passage hole of the tube 6 and the axis of the passage hole 2 in which the plug 8 is fastened is not exactly equal to the nominal distance between these axes, the adjustable connecting assembly 13 makes it possible to compensate this dimensional fault by movement of the slide block 15 relative to the support 14, one way or the other in the direction 18.

Likewise, a slight deviation from parallel alignment between the axis of the passage hole of the tube 6 and the axis of the passage hole 2 can be compensated by rotating the second support 16 relative to the slide block 15 about the axle 21 and the axles 22 and 24.

The positioning is thus carried out very reliably and very quickly, and during the rotation of the element 25 of the welding head 11 the tip 26a of the electrode 26 moves in a plane perfectly parallel to the end of the plug to be welded and at an absolutely constant distance from such end.

The positioning and the holding of the welding head in the correct position are ensured quickly and in a manner which can be completely automatic, whatever the defects in the positioning and alignment of the passage holes in the tube plate.

It is possible to provide for a different mounting of the second support of the welding head in relation to the slide block, from the moment when this mounting makes it possible to absorb any misalignment of the axes of the fastening means and of the welding machine.

Likewise, the devices for returning the slide block and the welding head can have a form different from the one described.

The second support of the welding head may be in a form other than a yoke, and the welding head may be rigidly fastened to such support.

The invention can be used for the welding of tubular pieces other than closing plugs for tube replacement sleeves, inside a bore of a tube plate of a steam generator.

We claim:

1. In a device for welding a circular end part of a tubular piece fastened inside a bore opening onto a face of a plate, such as a steam-generator tube plate having a set of tube passage holes arranged according to a regular network, said device comprising:

a-fastening means having a cylindrical part adapted to be introduced in a tube of the network and a jack for actuating said cylindrical part, and a welding head comprising a centering bush adapted to be introduced into a tubular piece to be welded, and a welding electrode mounted rotatably about an axis of said centering bush, the improvement consisting of an adjustable connecting assembly between said fastening means and said welding head, allowing translational movements of said welding head relative to said fastening means in the direction of a perpendicular common to an axis of said cylindrical part of said fastening means and to an axis of said centering bush and relative rotational movements about two perpendicular axles, one of which is parallel to the direction of said translational movement, wherein said connecting assembly comprises (a) a first support fixed to said fastening means and comprising guide means defining a sliding plane and a sliding direction oriented along said perpendicular common to said axis of said cylindrical part of said fastening means and to said axis of said centering bush of said welding head;

(b) a slide block mounted for movement in said sliding direction on said guide means;

(c) a second support carrying said welding head mounted on said slide block and movable in rotation relative to said slide block about a first axle parallel to said sliding direction and about a second axle parallel to said sliding plane and perpendicular to said first axle; and (d) means for returning said slide block in relation to said slide block.

2. The improvement according to claim 1, wherein said second support has the shape of yoke with two branches, said welding head being mounted by means of journals between said two branches for pivoting movement about said second axle of rotation.

3. The improvement according to claim 1, wherein the means for returning said slide block in relation to said first support comprise two levers mounted in an articulated manner on said slide block about parallel axes and returned towards one another by means of a helical spring, said levers abutting against bearing faces of said support.

4. The improvement according to claim 1, comprising a sliding spring finger mounted on said slide block and having an end supporting said second support, said spring finger being adapted to retain said second support relative to said slide block and to maintain play between said slide block and said second support.

5. The improvement according to claim 1, wherein said means for returning said second support in relation to said slide block consist of helical springs fastened both to a support fixed to said welding head and to said slide block.

* * * * *

UNITED STATES PATENT AND TRADEMARK OFFICE
CERTIFICATE OF CORRECTION

PATENT NO. : 4,942,280

DATED : Jul. 17, 1990

INVENTOR(S) : Jean P. Gaudin, et al.

It is certified that error appears in the above-identified patent and that said Letters Patent is hereby corrected as shown below:

Column 10, line 5, after "to" insert --the first support and the second support in relation to--.

Signed and Sealed this

Sixth Day of April, 1993

Attest:

STEPHEN G. KUNIN

*Attesting Officer*  *Acting Commissioner of Patents and Trademarks*